United States Patent [19]

Hughes

[11] 4,074,203

[45] Feb. 14, 1978

[54] ELLIPTICAL BEAM AMPLIFYING SYSTEM

[76] Inventor: John Leonard Hughes, 34 Nungara Place, Aranda, A.C.I., Australia, 2614

[21] Appl. No.: 686,542

[22] Filed: May 14, 1976

[30] Foreign Application Priority Data

May 15, 1975 Australia .............................. 1609/75

[51] Int. Cl.$^2$ .............................................. H01S 3/00
[52] U.S. Cl. ................................ 330/4.3; 331/94.5 D; 331/94.5 E
[58] Field of Search .................... 330/4.3; 331/94.5 D, 331/94.5 E

[56] References Cited

U.S. PATENT DOCUMENTS

| 3,270,290 | 8/1966 | Maurer | 330/4.3 |
|---|---|---|---|
| 3,346,741 | 10/1967 | Mayer et al. | 330/4.3 |
| 3,437,942 | 4/1969 | Maiman | 330/4.3 |
| 3,626,318 | 12/1971 | Young | 330/4.3 |
| 3,872,401 | 3/1975 | Cooley | 331/94.5 E |
| 3,963,995 | 6/1976 | Jacob | 330/4.3 |

Primary Examiner—S. C. Buczinski

[57] ABSTRACT

A laser amplifier system is provided for amplifying laser beams of elliptical cross-section which includes one or more amplifying disc segments of circular cross-section, the diameter of these segments being much greater than their thickness and also equal to the major axis of the laser beam cross-section. The segment of circular cross-section is oriented at an angle to the minor axis of the elliptical beam cross-section given by the cosecant of the ratio of minor to major axes of the beam cross-section and symmetric about the axis of propagation of the laser beam.

8 Claims, 7 Drawing Figures

ELLIPTICAL BEAM AMPLIFYING SYSTEM

BACKGROUND OF THE INVENTION

This invention relates to a laser amplifier system and method capable of amplifying laser beams of elliptical cross-section of high eccentricity.

Prior art laser amplifier systems have either used a single laser beam of circular cross-section amplified in a laser amplifier segment of circular cross-section positioned perpendicular to the propogation axis of the beam or have used multiple passes of a circular cross-section laser beam through different portions of a circular cross-section segments positioned at the well known Brewster angle to the direction of propogation of the beams. Furthermore, it is standard practice in commercially available segmented disc amplifiers to use a laser beam of circular cross-section and disc amplifier segments of elliptical cross-section to satisfy the Brewster angle orientation configuration. This latter configuration has superceded the two previous configurations which utilized circular cross-section beams and disc segments due to the fact that it is matched for Brewster angle operation.

However, with the advent of high power lasers it was realised that relatively low damage thresholds in the amplifier segments meant that the laser beam to be amplified had to be diverged to spread out the load so as to operate the amplifier below damage flux density. This fact meant that the aperture area of the amplifier segments had to be increased to accommodate the expanding beam undergoing amplification. It has been found that large laser systems are limited in beam diameter by the size of amplifier segments that can be used. These segments are of elliptical cross-section and it is the length of their major axis which determines the maximum diameter of the circular cross-section laser beam to be amplified. On the large neodymium-glass lasers now in operation, the size of the elliptical cross-section amplifier segment is limited by its major axis which exceeds the self-oscillation threshold at about 40 cms. This in turn limits the diameter of the circular cross-section laser beam to about 25 cms. Since much larger area beams are required from high power lasers either one needs a much better laser medium from the viewpoint of damage threshold, travelling wave excitation of laser media to supress parasitic oscillations prior to the arrival of the laser beam or more effective utilization of current technology. The present invention provides for better utilization of current technology with a laser beam of elliptical rather than circular cross-section.

SUMMARY OF THE INVENTION

It is an aim of the present invention to increase the effectual area of a laser amplifier segment, and hence its output capability whilst still operating below its self-oscillation threshold, a well known defect in which parasitic amplification within the segment can deplete its stored energy before the arrival of the laser beam to be amplified.

A further aim of the present invention is to provide a better excitation efficiency for the excitation of such amplifier segments due to the fact that excitation means can be closer coupled around an elliptical beam and its circular aperture amplifier segment than would be the case for a corresponding situation with laser beams of circular cross-section. The improvement in coupling depends on the eccentricity of the elliptical cross-section of the laser beam. For high eccentricity the excitation means such as flashtubes can be very close to the surface of the segment.

The amplifier system of the invention consists of one or more segments whose input and output apertures are of circular cross-section and tilted with respect to the axis of propogation of the elliptical cross-section beam to be amplified by an angle which depends on the eccentricity of the ellipse, that is to say the ratio of its minor to major axes. If the thickness of the amplifying segment is much less than the diameter of its apertures then the segment can be of cylindrical form with a circular cross-section. On the other hand, if the thickness of the segment was comparable to, or greater than, its input and output aperture diameter, then it would have to take the form of a cylinder with an elliptical cross-section to avoid excessive waste of amplifier medium material that would be involved if the segment, under these conditions, had a circular cross-section. This latter configuration is not considered.

The present invention can be related to currently available circular cross-section beam amplifiers by considering the 40 cms major axis of the elliptical amplifier segment as a 40 cms diameter of an amplifier segment of circular cross-section. This provides about twice the aperture area of the elliptical segment. If this circular disc segment is tilted, for example at Brewster angle, then it will match a laser beam of elliptical cross-section with a major axis of 40 cms and a minor axis of about 22 cms. Under these conditions, the laser beam of elliptical cross-section enters and leaves the disc segment of circular cross-section via a circular aperture area of diameter 40 cms. Refraction of the beam of elliptical cross-section within the disc segment of circular cross-section would form a beam of elliptical cross-section with larger minor axis, i.e. less eccentricity than the input-output beams, if the thickness of the segment was comparable to or greater than the diameter of the input and output apertures. Under this situation, however, self-focussing damage would occur at high power levels. The invention is therefore, restricted from a practical viewpoint to the case where the diameter of the input and exit apertures are much greater than the thickness of the amplifying segment. Under these conditions the cross-section of the amplifying segment can be almost the same to the cross-section of the input and output apertures without serious wastage of laser medium material arising from the refraction path of the elliptical cross-section beam undergoing amplification.

DESCRIPTION OF THE PREFERRED EMBODIMENTS

Figure 1:
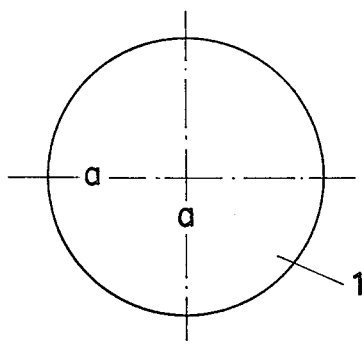
FIG. 1 illustrates the disc segment.
Figure 2:
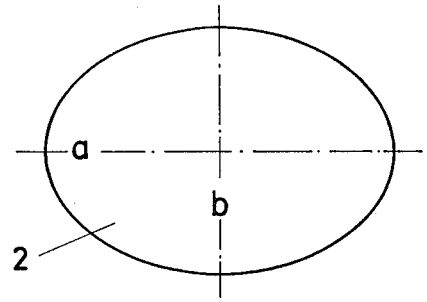
FIG. 2 illustrates an elliptical cross-section beam.

A circular disc segment of diameter $a$ is depicted in FIG. 1. FIG. 2 illustrates a beam of elliptical cross-section having a major axis $a$ identical to the diameter $a$ of the disc segment and a minor axis $b$. It is realised that in FIGS. 1 and 2 of the drawings, the diameter of the circle in FIG. 1 is not identical linearly to the major axis of the ellipse in FIG. 2 but it is intended that they are equal.

Figure 3:
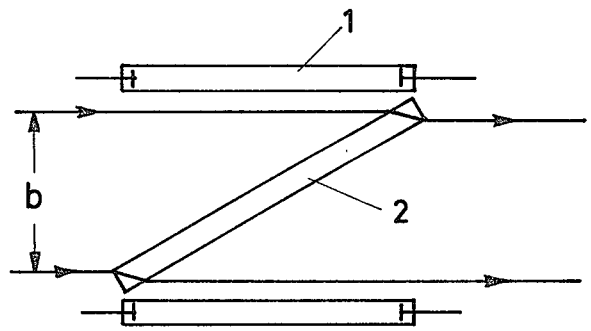
FIG. 3 is a basic segment arrangement.

The basic amplifier segment is shown intersecting a beam of elliptical cross-section in FIG. 3. For an elliptical cross-section beam of major axis a and minor axis b, the circular cross-section disc segment 2 must be tilted at an angle to the minor axis whose cosecant is $a/b$. Under these conditions the area of the disc segment intersecting the beam will be of circular cross-section and of a diameter equal to the major axis of the elliptical cross-section of the beam, i.e. equal to a. This means that the area of the beam 1 as it enters and leaves the disc segment is effectively increased by $$(\pi a^2/4)/(\pi ab/4) = (a/b)$$

where a is the major axis and b the minor axis of the elliptical cross-section of the laser beam undergoing amplification. Therefore, if the eccentricity of the elliptical beam cross-section is 0.1, the present invention provides an effective segment aperture area ten times the cross-sectional area of the beam. Therefore, the flux density in the beam outside the amplifier segment may exceed damage threshold whilst it would be well below damage threshold to the segment.

Figure 4:
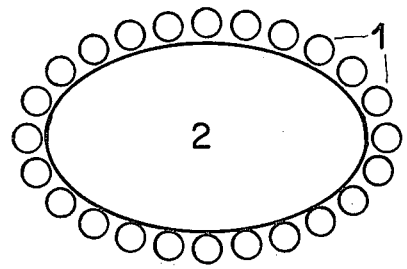
FIGS. 4 to 7 a disc segment surrounded by excitation means as shown.
Figure 5:
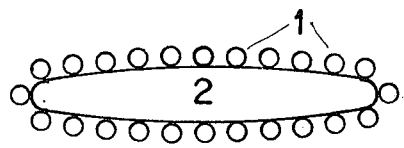
Figure 6:
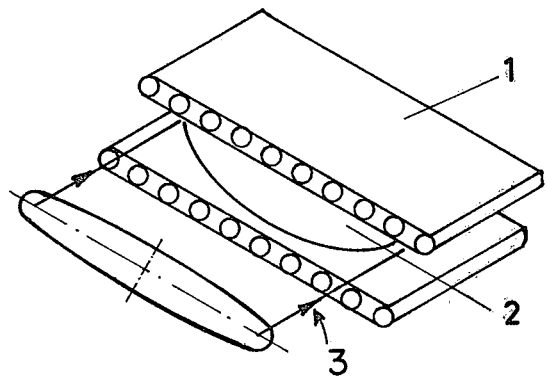
Figure 7:
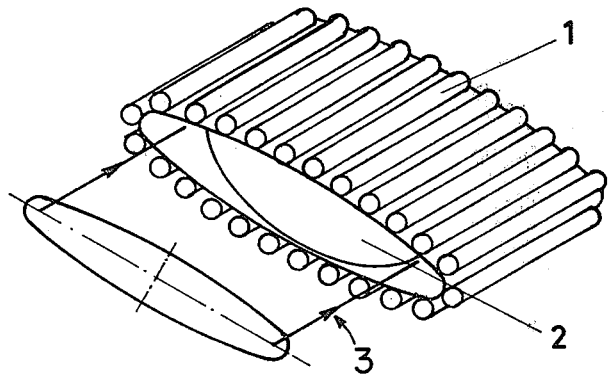

In a preferred arrangement a further advantage of the present invention is the fact that the means of exciting the disc segment may be distributed along the perimeter of an ellipse rather than a circle around the segment. This can provide a much closer coupling of excitation means, for example flashtubes or photo emitting diodes as shown in FIGS. 4 to 7 which diagrammatically illustrate various arrangements. In FIGS. 4, 5 and 7 the excitation means are shown contiguous to the perimeter of the disc. In FIG. 6 the excitation means are positioned around the disc segment but at a distance less than the major axis of the elliptical beam.

Since the orientation of the circular disc segment relative to the minor axis of the elliptical beam cross-section is given by the cosecant of the ratio of $a/b$ it follows that the reflective losses will depend on the particular eccentricity of the ellipse. Near the well known Brewster angle, the reflective losses will be low, however, away from Brewster angle the reflective losses will have to be reduced via appropriate anti-reflection coating for the particular orientation.

The input beam 3 of elliptical cross-section with major axis a and minor axis b is passed through a disc amplifier segment 2, which may be one of a series of disc segments e.g. five, the disc segment 2 being orientated at an angle which cosecant is $a/b$ with respect to the minor axis of the incoming elliptical beam. This results in a circular beam of diameter a passing through the segment and emerging to form an elliptical beam cross-section again. Adjacent segments may vary in size to accommodate the divergence of the laser beam when the system is used as a single direction amplifier.

Standard techniques are available to generate laser beams of elliptical cross-section and to correct these to circular cross-section. Obviously other conventional components of amplifying systems may be used in the present invention.

The present invention is ideally suited to neodymium doped glass amplifying segments. The disc may also be made of ruby or neodymium doped yttrium aluminium garnet. It should be pointed out that discs of circular cross-section are usually simpler to manufacture to the required standards than disc segments of elliptical cross-sections.

Fluid media such as gaseous iodine, gaseous oxygen and liquid neodymium doped selenium oxychloride in container segments of circular cross-section may be used provided that the diameter of such segments is much larger than the thickness of the fluid amplifying medium contained therein. When using fluid media in the present invention it is important that the circular faces of the container efficiently transmit the laser wavelength. It may be the case that a fluid medium can be excited by means other than flash tubes and photo-emitting diode arrays, for example by electron beams, and could also be flowed through the container segments of circular cross-section.

In practice, the elliptical beam input for the present invention may be generated, via matching optics where necessary, by the elongated slab laser amplifier described in U.S. Pat. No. 3,928,811, whilst the output elliptical beam of the present invention may be converted to a high power laser beam of circular cross-section for use in apparatus designed for laser beams of circular cross-section.

The present invention has applications in any field requiring high power laser outputs, for example, laser fusion studies, non-linear optical studies and laser ranging to various targets.

I claim:

1. A laser amplifier system for amplifying laser beams of elliptical cross-section comprising one or more amplifying disc segments of circular cross-section whose effective diameter is much greater than its thickness and equal to the major axis of the laser beam cross-section, the said segment of circular cross-section being orientated at an angle to the minor axis of the elliptical beam cross-section given by the cosecant of the ratio of minor to major axes of the elliptical beam cross-section and symmetric about the axis of propogation of the laser beam.

2. A system as claimed in claim 1 also including an array of flashtubes positioned around the disc segment parallel to the direction of propogation of the laser beam, on the perimeter of an ellipse whose major axis is as close as practical to the diameter of the disc segments and whose minor axis is as close as practical to the minor axis of the beam.

3. A system as claimed in claim 1 also including an array of photo-emitting diodes, positioned around the disc segment on the perimeter of an ellipse whose major axis is as close as practical to the diameter of the disc segments and as close as possible to the minor axis of the beam.

4. A system as claimed in claim 1 also including flashtubes or photo-emitting diode excitation arrays positioned around the disc segment at a distance which is less than the major axis of the elliptical cross-section of the laser beam.

5. A laser amplifier system as claimed in claim 1 where the laser medium is neodymium doped glass.

6. A laser amplifier system as claimed in claim 1 where the laser medium is neodymium doped yttrium aluminium garnet.

7. A laser amplifier system as claimed in claim 1 where the laser medium is ruby.

8. A laser amplifier system as claimed in claim 1 where the circular cross-section segment is in the form of a container containing iodine.

* * * * *